US007032713B2

(12) United States Patent
Huang et al.

(10) Patent No.: US 7,032,713 B2
(45) Date of Patent: Apr. 25, 2006

(54) BATTERY-OPERATED GREASE GUN WITH AN ELECTRONIC PRESSURE REGULATOR FOR CONTROLLING PRESSURE OF THE GREASE

(75) Inventors: San-I Huang, Taichung (TW); Albert Yeh, Taichung (TW)

(73) Assignee: Techway Industrial Co., Ltd., Taichung (TW)

( * ) Notice: Subject to any disclaimer, the term of this patent is extended or adjusted under 35 U.S.C. 154(b) by 508 days.

(21) Appl. No.: 10/444,822

(22) Filed: May 22, 2003

(65) Prior Publication Data

US 2004/0231927 A1 Nov. 25, 2004

(51) Int. Cl.
*F01M 11/04* (2006.01)

(52) U.S. Cl. .............................. 184/105.2; 184/105.1; 222/333; 222/263

(58) Field of Classification Search ............ 184/105.1, 184/105.2; 222/333, 263
See application file for complete search history.

(56) References Cited

U.S. PATENT DOCUMENTS

| | | | | |
|---|---|---|---|---|
| 5,105,912 | A * | 4/1992 | Heister | 184/105.2 |
| 5,609,274 | A * | 3/1997 | Shih et al. | 222/262 |
| 2004/0226969 | A1* | 11/2004 | Shew | 222/333 |

* cited by examiner

*Primary Examiner*—David Fenstermacher
(74) *Attorney, Agent, or Firm*—Dellett & Walters

(57) ABSTRACT

A battery operated grease gun has a motor that drives a planetary gear assembly that is coupled to a pump assembly that drives a plunger reciprocally in an grease passage to discharge grease through a discharge spout. The pressure in the grease exerts a reaction force on the plunger that will change torque of the motor. The change of the torque of the motor will simultaneously effect voltage applied to the motor. When the voltage in the motor changes, an electronic pressure regulator measures the voltage in the motor to determine the pressure in the grease in the grease passage and stops the motor as the pressure in the grease reaches preset given valves in the pressure regulating device.

3 Claims, 7 Drawing Sheets

BATTERY-OPERATED GREASE GUN WITH AN ELECTRONIC PRESSURE REGULATOR FOR CONTROLLING PRESSURE OF THE GREASE

BACKGROUND OF THE INVENTION

1. Field of the Invention

The present invention relates to a battery-operated grease gun, and more particularly to a battery-operated grease gun with an electronic pressure regulator that will allow grease to be discharged in multiple stages at different pressures.

2. Description of Related Art

Battery-operated grease guns make lubricating parts in machines much easier. With reference to FIG. 7, a conventional battery-operated grease gun has a body (60), a pump assembly (not numbered) and a cylindrical lubricant reservoir (61). The body (60) has a grease channel (601), a ball check valve (62) and a discharge spout (63). The grease channel (601) has an inner opening (not numbered) and an outer opening (not numbered). The ball check valve (62) is mounted in the body (60) and communicates with the outer opening in the grease channel (601). The ball check valve (62) has a ball (621), a spring (622) and a threaded plug (623) and is held in place by the threaded plug (623). The discharge spout (63) is attached to the body (60) and communicates with the ball check valve (62).

The pump assembly is mounted in the body (60) and comprises a motor (64) with a drive shaft (641), a three-stage planetary gear assembly (65), a drive disk (66), a drive pin (67), a sliding block (68), a plunger (69) and a drive channel (not numbered) defined in the body (60). The sliding block (68) is slidably mounted in the drive channel and has a transverse cam slot (not numbered). The planetary gear assembly (65) has a sun gear (651) attached to the drive shaft (641) and reduces the speed and increases the torque of the drive shaft (641). The drive disk (66) is coupled to and rotated by the planetary gear assembly (65) and has an eccentric threaded hole (not numbered). The drive pin (67) has a threaded end (not numbered) and a bottom end (not numbered). The threaded end is screwed into the eccentric threaded hole in the drive disk (66), and the bottom end extends out of the eccentric threaded hole and into the transverse cam slot in the sliding block (68) to reciprocally drive the sliding block (68). The plunger (69) has a distal end (not numbered) and a proximal end (not numbered). The distal end is held slidably in the grease channel (601), and the proximal end is attached to the sliding block (68). The cylindrical lubricant reservoir (61) is attached to the body (60) and communicates with the grease channel (601) to supply the lubricant to the grease channel (601).

To discharge the grease, the motor (64) rotates the planetary gear assembly (65) that rotates the drive disk (66). The rotating drive disk (66) and drive pin (67) move the sliding block (68) reciprocally through the drive pin (67). The sliding block (68) simultaneously moves the plunger (69) with a reciprocating motion to pump the grease out through the discharge spout (63). To control the flow rate and flow speed of the grease oil, the threaded plug (623) can be screwed into the body (60) to compress the spring (622). Compression of the spring (622) with the threaded plug (623) applies a greater force on the ball (621), which loads the motor (64) and causes the grease to be discharged at a slower rate and speed.

Consequently, the conventional way to control the flow rate of the grease is tightening the threaded plug (623) to compress the spring (622). However, tightening the threaded plug (623) to control the flow rate is imprecise, at best. Furthermore, the three-stage planetary gear assembly (65) is large and causes the body (60) of the grease gun to be large. Since the sliding block (68) is driven by only one drive disk (66), power transmission between the drive pin (67) and the sliding block (68) only depends on one-side load, the drive disk (66), and is not reliable. One-side load on the sliding block (68) will cause a biasing force that will cause localized friction on the sliding block (68). The sliding block (68) wears unevenly and is not durable.

To overcome the shortcomings, the present invention provides a battery-operated grease gun with an electronic pressure regulator to control the pressure of the discharging grease to mitigate or obviate the aforementioned problems.

SUMMARY OF THE INVENTION

The main objective of the invention is to provide battery-operated grease gun having an electronic pressure regulator to control efficiently the pressure of the discharging grease in multiple stages.

Other objectives, advantages and novel features of the invention will become more apparent from the following detailed description when taken in conjunction with the accompanying drawings.

DETAILED DESCRIPTION OF PREFERRED EMBODIMENT

Figure 1:
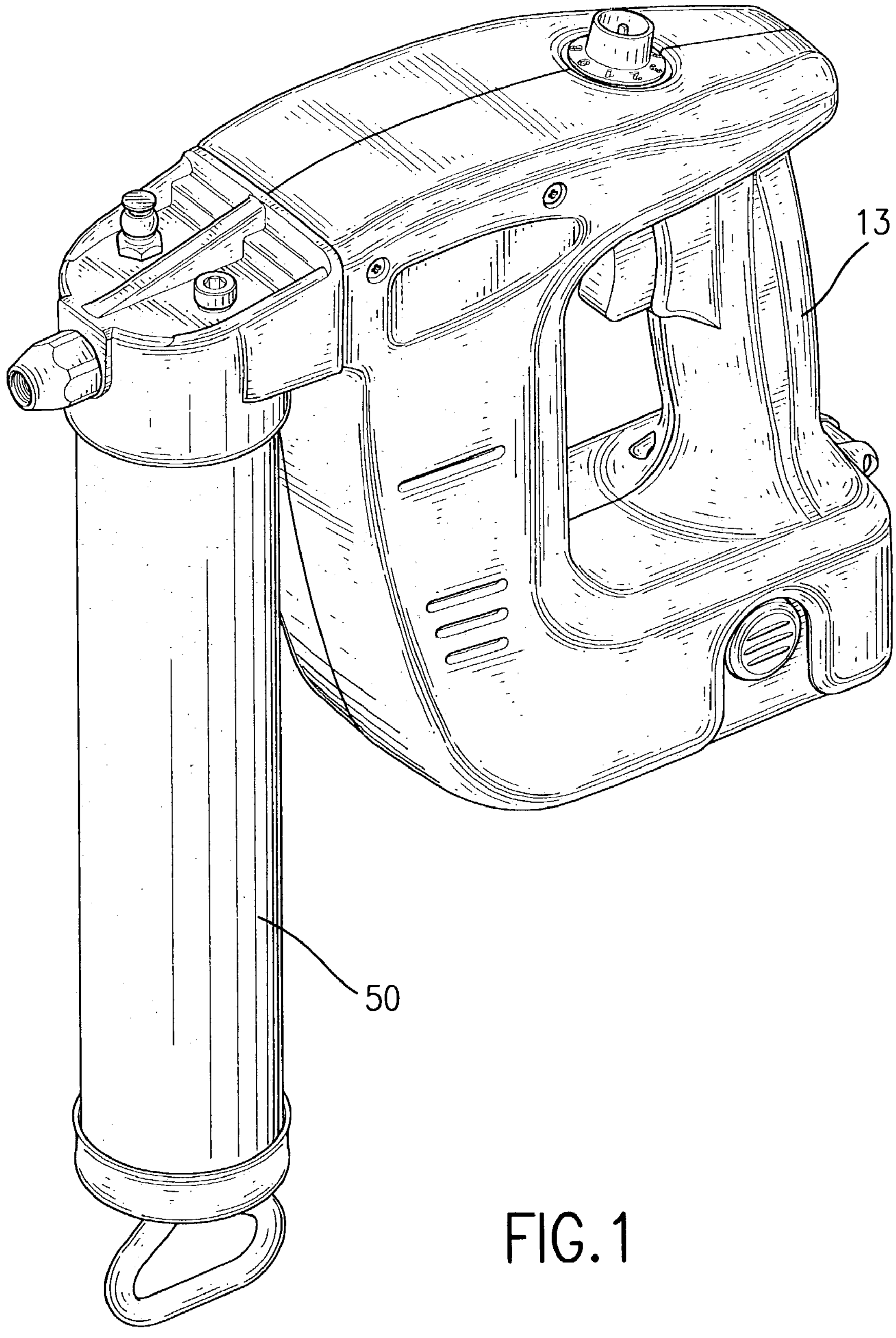
FIG. 1 is a perspective view of a grease gun in accordance with the present invention.
Figure 2:
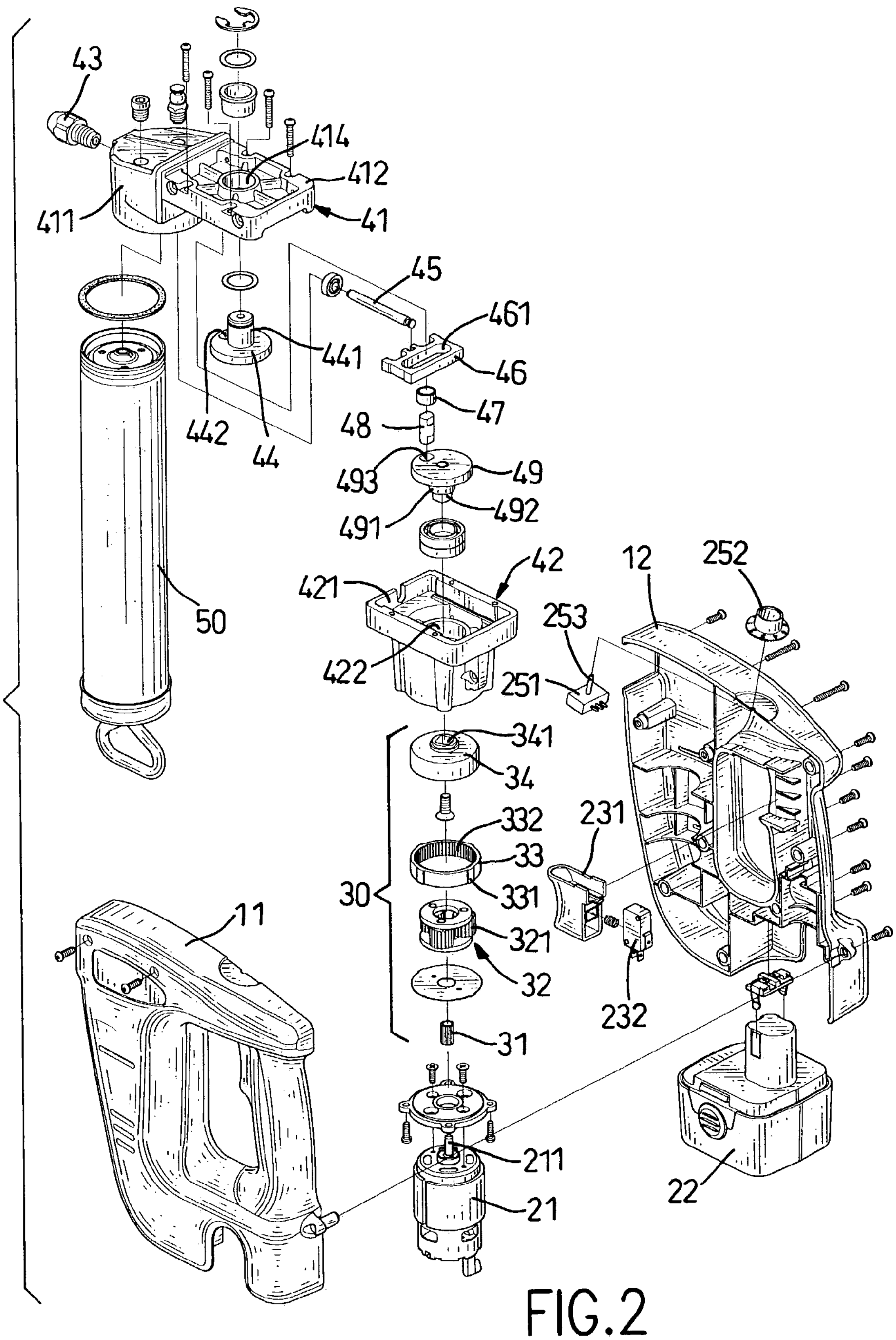
FIG. 2 is an exploded, perspective view of the grease gun in FIG. 1.

With reference to FIGS. 1 and 2, a battery-operated grease gun comprises a housing (not numbered), a motor drive assembly (not numbered), a planetary gear assembly (30), a gear housing (42), a pump assembly (not numbered) and a cylindrical lubricant reservoir (50). The housing has a front (not numbered), a rear (not numbered), a top (not numbered), a bottom (not numbered) and a handle (13) and comprises a left shell (11) and a right shell (12). The left shell (11) and the right shell (12) are connected to each other, and the handle (13) is formed at the rear of the housing.

The motor drive assembly is mounted in the housing and comprises a motor (21), a battery pack (22), an electronic pressure regulator (not numbered) and a switch (not numbered). The motor (21) has a drive shaft (211) that protrudes from the motor (21). The switch connects electrically between the motor (21) and the battery pack (22). The switch can be a pushbutton (not shown), a toggle switch (not shown), a sliding trigger (231) and a microswitch (232) or the like. Where the switch is implemented with a sliding trigger (231) and a microswitch (232), the sliding trigger (231) is slidably mounted in the handle (13) and corresponds to the microswitch (232) that is electrically connected between the motor (21) and the battery pack (22).

Figure 6:
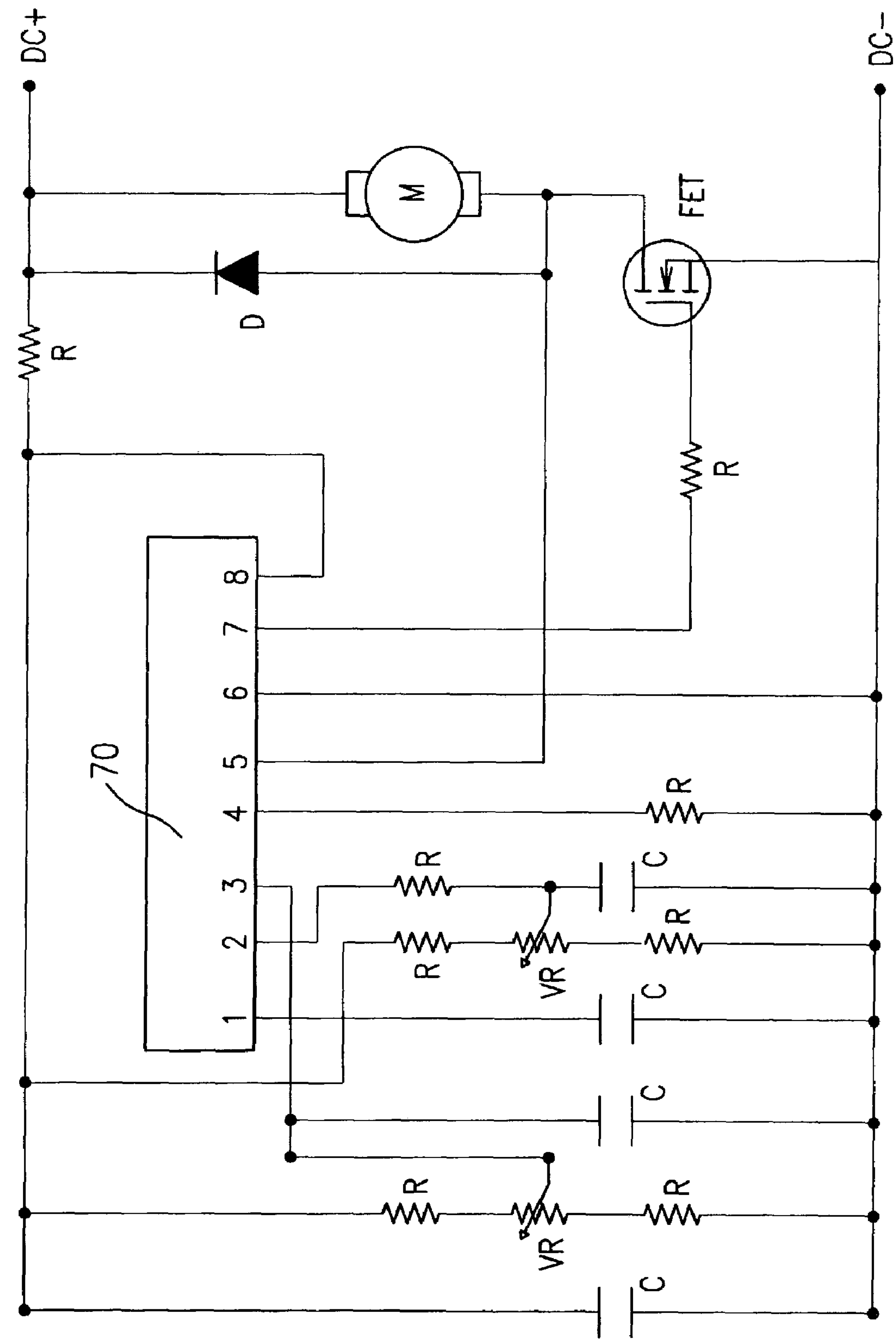
FIG. 6 is a circuit diagram of an electronic pressure regulator for measuring variation in working voltage applied in a motor.
Figure 7:
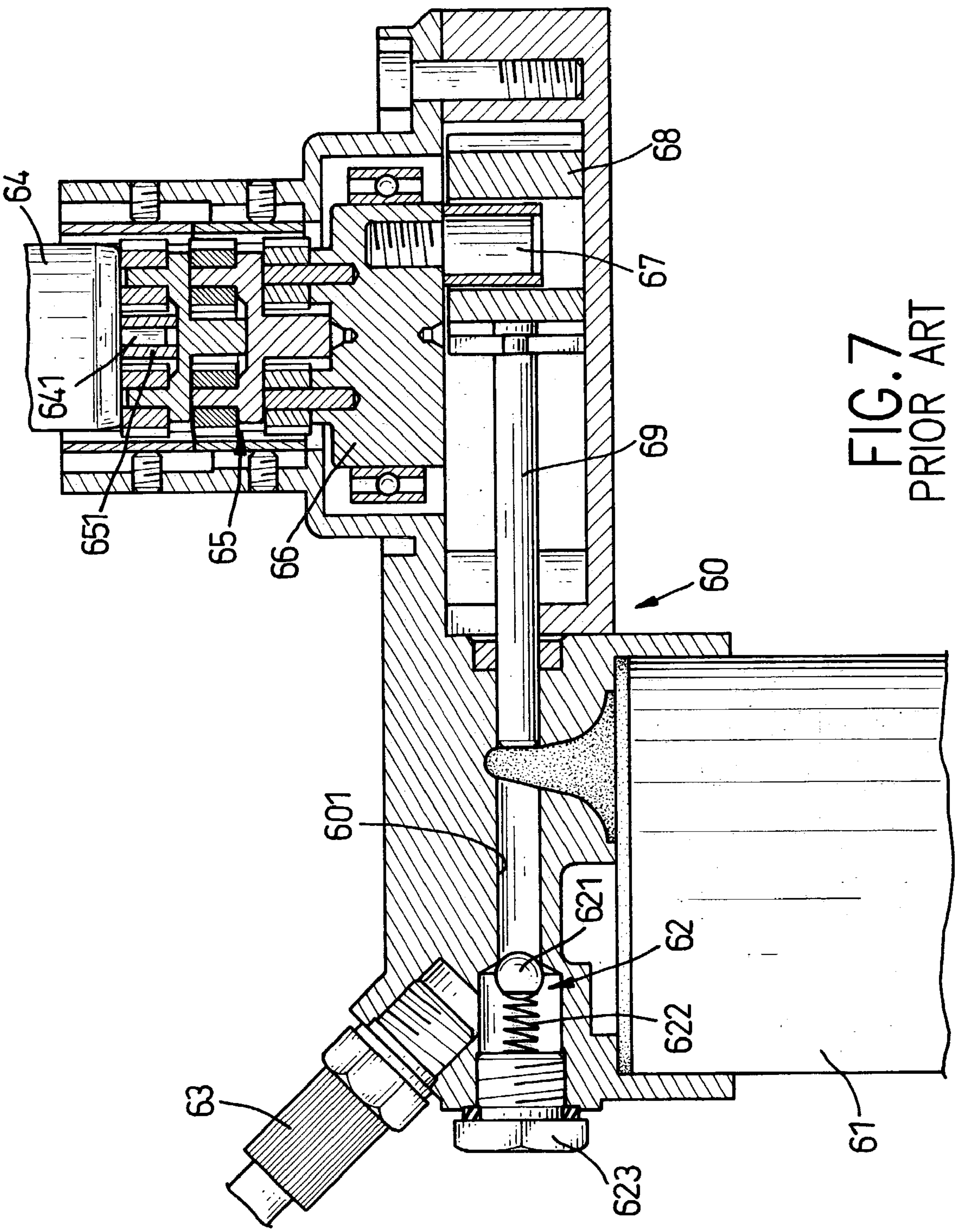
FIG. 7 is a side plan view in partial section of a conventional battery- operated grease gun in accordance with the prior art.

With further reference to FIG. 6, the electronic pressure regulator comprises a control box (251), an adjustment shaft (253) and an adjustment knob (252). The control box (251) has a circuit (not numbered) with a micro controller (70) electrically connected to the microswitch (232) and the battery pack (22) to measure variation in the working voltage in the motor (21) and to stop the motor (21). The adjustment shaft (253) extends out of the housing. The adjustment knob (252) is attached to the adjustment shaft (253) to preset selectively several discharge pressures for the grease. Since the torque developed in the drive shaft (211) is directly proportion to the square of the voltage applied to the motor (21), a specific voltage applied to the motor (21) will generate a specific torque on the drive shaft (211). The transmitted torque of the drive shaft (211) develops the pressure in the grease. So, the pressure in grease is determined by measuring the voltage of the motor (21).

Figure 3:
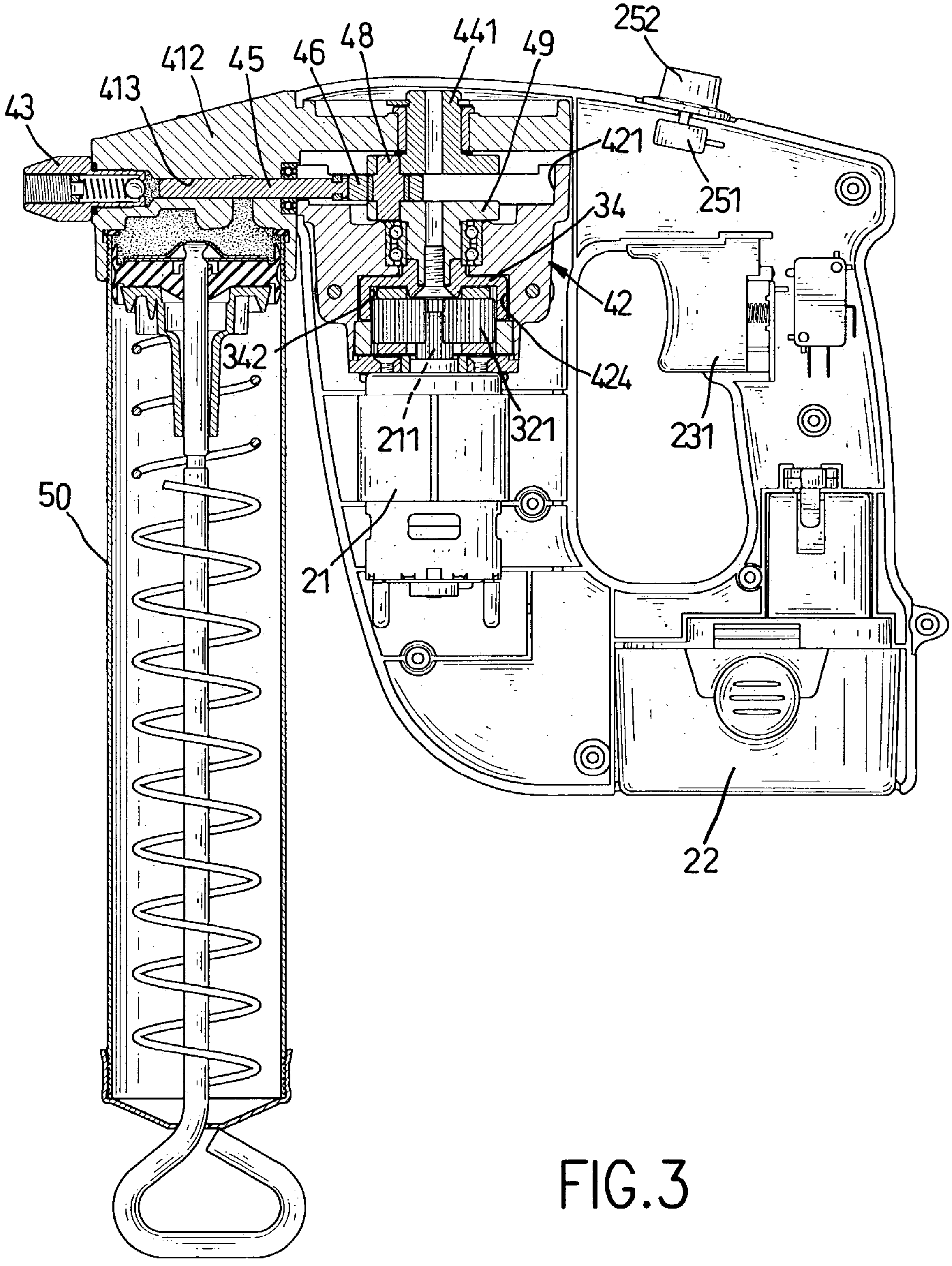
FIG. 3 is a side plan view in partial section of the grease gun in FIG. 1.
Figure 4:
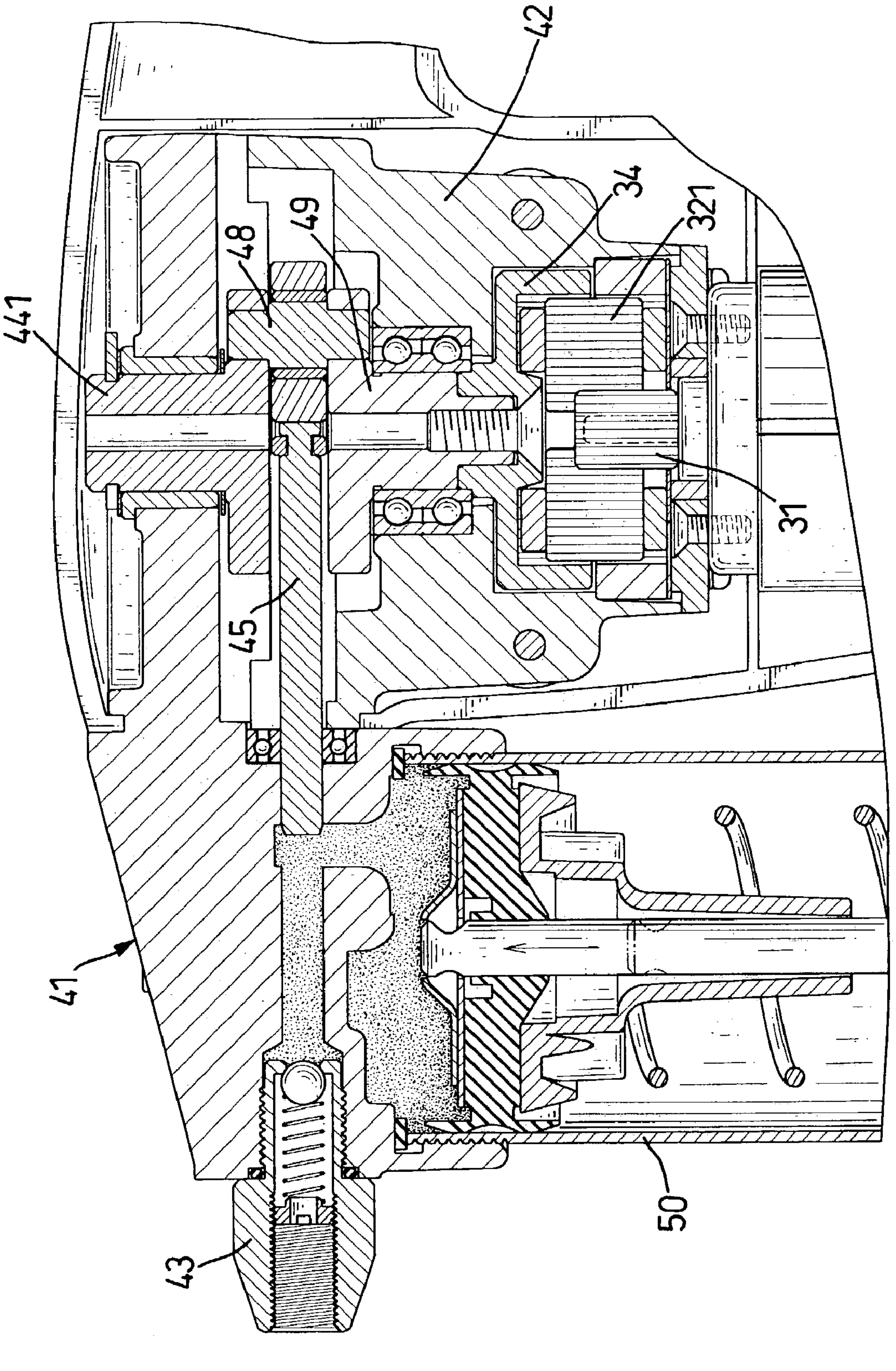
FIG. 4 is an enlarged side plan view in partial section of the grease gun in FIG. 3.
Figure 5:
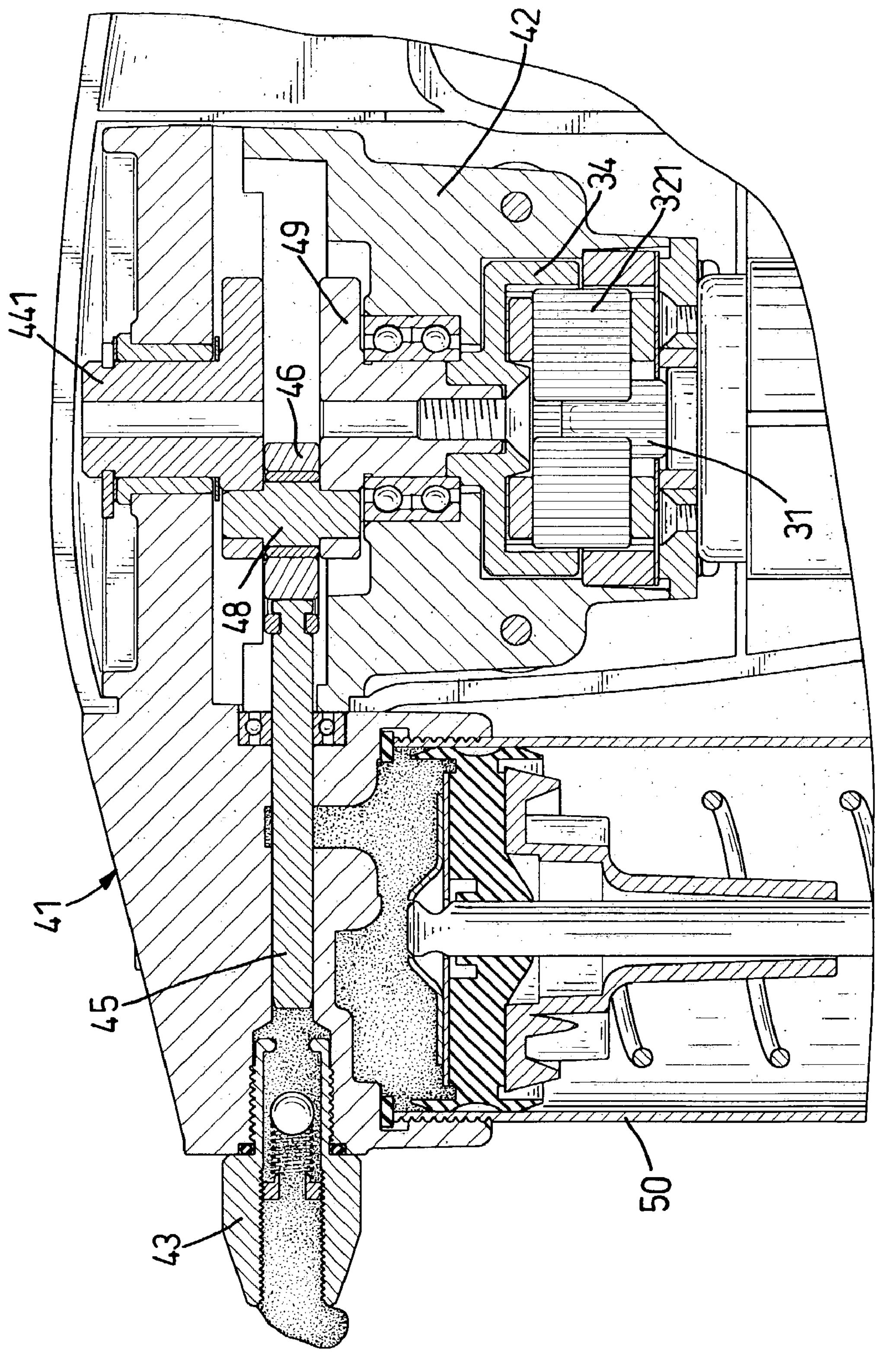
FIG. 5 is an operational side plan view in partial section of the grease gun in FIG. 4 when the grease gun is discharging grease.

With reference to FIGS. 2 and 3, squeezing the sliding trigger (231) depresses the microswitch (232) and connects the motor (21) to the battery pack (22). The planetary gear assembly (30) comprises a sun gear (31), three planet gears (321), a stationary ring gear (33) and a rotating ring gear (34). The sun gear (31) is attached to and rotated by the drive shaft (211). Three planet gears (321) are mounted between two carriers (not numbered) and simultaneously engage the sun gear (31). The stationary ring gear (33) has external keys (331) and a series of internal teeth (332) that simultaneously engage the three planet gears (321). The stationary ring gear (33) is mounted in the gear housing (42) and is held in position by the keys (331). The rotating ring gear (34) is rotatably mounted in the gear housing (42) above the stationary ring gear (33) and has a top (not numbered) with a faceted through hole (341) and a series of internal teeth (342) that simultaneously engage the three planet gears (321). The number of the teeth of the stationary ring gear (33) is less than that of the rotating ring gear (34) by an integer number times the number of the teeth of the planet gear (321). Tooth root circles of the rotating and the stationary ring gears (34, 33) are substantially the same such that the planet gears (321) have a uniform diameter. Therefore, when the sun gear (31) rotates the planet gears (321), the planet gears (321) will rotate the rotating ring gear (34) with a reduced angular speed with respect to the angular speed of the drive shaft (221).

The gear housing (42) has a top (not numbered), a bottom (not numbered), a top recess (421), a countersunk though hole (422), a bottom recess (424), a drive bearing (not numbered) and a bottom cover (not numbered). The top recess (421), the countersunk though hole (422) and the bottom recess (424) are defined through the gear housing (42) in sequence from the top to the bottom and communicate with each other. The planetary gear assembly (30) is mounted in the bottom recess (424) and is held in the bottom recess (424) by the bottom cover that is securely attached to bottom of the gear housing (42). The drive bearing is mounted in the countersunk though hole (422).

The pump assembly comprises a main body (41), a discharge spout (43), an upper drive disk (44), a plunger (45), a sliding block (46), a bushing (47), a drive pin (48) and a lower drive disk (49). The main body (41) comprises a cylindrical skirt (411) and a gear housing cap (412) with a longitudinal through hole (414). The cylindrical skirt (411) is outside the housing and has a grease passage (413) with an outside opening (not numbered). The discharge spout (43) is conventional and is attached to the outside opening of the grease passage (413). The gear housing cap (412) closes the top of the gear housing (42) and is mounted inside in the housing.

The sliding block (46) is slidably mounted in the top recess (421) in the gear housing (42) and has a transverse cam slot (461). The transverse cam slot (461) has a top and a bottom. The bushing (47) is mounted around the drive pin (48) that is slidably mounted in the transverse cam slot (461). The drive pin (48) has a top faceted end (not numbered) and a bottom faceted end (not numbered) that extend respectively out of the top and bottom of the transverse cam slot (461). The upper drive disk (44) is mounted over the sliding block (46) and has a top face (not numbered), a bottom face (not numbered), an upper faceted hole (442) and an upper central shaft (441). The upper faceted hole (442) is formed eccentrically through the upper disk (44) and holds the top faceted end of the drive pin (48). The upper central shaft (441) is cylindrical, extends from the top face of the upper drive disk (44) and is mounted rotatably in the longitudinal through hole (414) in the main body (41).

The lower drive disk (49) is mounted under the sliding block (46) and has a top face (not numbered), a bottom face (not numbered), a lower faceted hole (493) and a lower central shaft (491). The lower faceted hole (493) is formed eccentrically through the lower disk (49) and holds the bottom faceted end of the drive pin (48). The lower central shaft (491) is cylindrical, has a proximal end (not numbered) and a distal end (492) and is mounted through the drive bearing in the countersunk through hole (422). The proximal end is integrally formed with and extends from the bottom face of the lower drive disk (49). The distal end (492) is faceted, is mounted in the faceted through hole (341) in the rotating ring gear (34) and is fastened by a bolt.

Thereafter, the rotating ring gear (34) will rotate the lower drive disk (49) that will simultaneously rotate the upper drive disk (44) through the drive pin (48). Movement of the drive pin (48) causes the sliding block (46) to move back and forth in the top recess (421). The plunger (45) has an outside end (not numbered) and an inside end (not numbered). The outside end is attached to the sliding block (46) and the inside end passes through and is held in the grease passage (413).

With reference to FIGS. 3, 4, 5 and 6, the lubricant reservoir (50) is attached to the cylindrical skirt (411) to allow the lubricant to enter the grease. passage (413) between the discharge spout (43) and the inside end of the plunger (45). The reciprocating motion of the sliding block (46) move the inside end of the plunger (45) reciprocally in the grease passage (413) to discharge grease continuously through the discharge spout (43). Since the grease is incompressible, a force caused by the motion of the inside end of the plunger (45) exerted on the grease in the grease passage (413) will be transmitted undiminished to the discharge spout (43). A reaction force against the force caused by the inside end of the plunger (45) will press on the inside end of the plunger (45) and will be transmitted to the drive shaft (211) and change the torque. The variation of the torque of the drive shaft (211) will effect the working voltage applied to the motor (21). The micro controller (70) measures the voltage in the motor (21) and determines when to stop the motor (21). If the pressure in the grease reaches a given value preset through the adjustment knob (252), the motor (21) will be stopped by the control box (251). The grease will be discharged under a given pressure. Furthermore, numbers of parts of the planetary gear assembly (30) are less than that of the conventional planetary gear assembly as previously described that will reduce the volume of the grease gun. Therefore, the grease gun will be compact and can be carried conveniently. Moreover, the sliding block (46) is driven by the two drive disks (44, 49), and non linear forces acts on the sliding block (46) are reduced. As a result, the shortcomings of the conventional grease gun are overcome by the grease gun in accordance with the present invention.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery operated grease gun comprising:

a housing having a handle;

a motor drive assembly mounted in the housing and comprising a motor having a drive shaft having an angular speed and torque;

a battery pack electrically connected to the motor;

a switch electrically connected between the motor and the battery pack; and an electronic pressure regulator having an adjustment knob and a control box having a adjustment shaft and a circuit electrically connected to the motor and the battery pack, and the adjustment shaft extending out of the housing to which the adjustment knob is attached;

a gear housing mounted in the housing and having a top, a bottom, a top recess defined through the top of the gear housing, a bottom recess defined through the bottom of the gear housing, a countersunk through hole communicating with the top recess and the bottom recess and a bearing mounted in the countersunk through hole;

a planetary gear assembly mounted in the bottom recess of the gear housing and coupled to the drive shaft of the motor to reduce angular speed and torque of the drive shaft;

a pump assembly mounted in the housing and comprising a main body having a cylindrical skirt and a gear housing cap with a longitudinal through hole, the cylindrical skirt mounted outside the housing and having a grease passage with an outside opening, and the gear housing cap mounted in the housing and covering the gear housing;

a discharge spout mounted and held in the outside opening of the grease passage;

a sliding block slidably mounted in the top recess of the gear housing and having a transverse cam slot with a top and a bottom;

a drive pin slidably mounted in the transverse cam slot to move the sliding block reciprocally and having a top faceted end and a bottom faceted end extending respectively out of the top and bottom of the transverse cam slot;

an upper drive disk having an upper central shaft rotatably mounted in the through hole of the gear housing cap over the sliding block and having an upper faceted hole formed eccentrically in the upper drive disk and holding the top faceted end of the drive pin; and a lower drive disk mounted rotatably in the countersunk through hole under the sliding block, and having a bottom face, a lower faceted hole formed eccentrically in the lower drive disk and holding the bottom faceted end of the drive pin, and a lower central shaft mounted through the drive bearing in the countersunk through hole and has a proximal end formed integrally with and extending from the bottom face and a distal end that is faceted and coupled to the planetary gear assembly;

a plunger attached to the sliding block and having an outside end attached to the sliding block and an inside end passing through and being held in the grease passage; and a cylindrical lubricant reservoir attached to the cylindrical skirt for lubricant will enter the grease passage.

2. The battery operated grease gun as claimed in claim 1, wherein the planetary gear assembly comprises a sun gear attached to and rotated by drive shaft;

three planet gears meshing simultaneously with the sun gear;

two carriers holding the planet gears together;

a stationary ring gear mounted in the gear housing and having multiple external keys and a series of internal teeth, the stationary ring gear held in the bottom recess with the external keys and the internal teeth of the stationary ring gear mesh simultaneously with the three planet gears; and a rotating ring gear rotatably mounted in the gear housing over the stationary ring gear and having a top with a faceted through hole and a series of internal teeth meshing simultaneously with the three planet gears;

wherein a number of the internal teeth of the stationary ring gear is less than that the number of the internal teeth of the rotating ring gear and the distal end of the lower central shaft of the lower disk is held in the faceted through hole of the rotating ring gear.

3. The battery operated grease gun as claimed in claim 2 further comprising a bushing slidably mounted in the transverse cam slot of the sliding block around the drive pin.

* * * * *